(12) United States Patent
Birchmeier et al.

(10) Patent No.: US 10,526,477 B2
(45) Date of Patent: Jan. 7, 2020

(54) PLASTICS-BASED MANUFACTURED ARTICLE AND PROCESS FOR FORMING

(71) Applicant: Eovations, LLC, Grand Rapids, MI (US)

(72) Inventors: Brett Birchmeier, Midland, MI (US); Richard McBride, New Carlisle, MI (US)

(73) Assignee: Eovations, LLC, Grand Rapids, MI (US)

( * ) Notice: Subject to any disclaimer, the term of this patent is extended or adjusted under 35 U.S.C. 154(b) by 621 days.

(21) Appl. No.: 14/283,726

(22) Filed: May 21, 2014

(65) Prior Publication Data

US 2014/0349074 A1    Nov. 27, 2014

Related U.S. Application Data

(60) Provisional application No. 61/826,120, filed on May 22, 2013.

(51) Int. Cl.
*C08L 23/12* (2006.01)
*B29C 55/00* (2006.01)
(Continued)

(52) U.S. Cl.
CPC ............ *C08L 23/12* (2013.01); *B29C 55/005* (2013.01); *B29C 59/005* (2013.01); *B29C 59/021* (2013.01); *C08K 3/26* (2013.01); *C08K 3/34* (2013.01); *C08L 23/06* (2013.01); *B29C 55/30* (2013.01); *B29C 2793/00* (2013.01); (Continued)

(58) Field of Classification Search
CPC ............... C08L 23/12; C08L 2205/025; C08L 2205/03; C08L 2207/20; B29C 59/005; B29C 59/021; B29C 55/30; B29C 55/005; B29C 2793/00; B29K 2023/06; B29K 2023/12; B29K 2995/0097; (Continued)

(56) References Cited

U.S. PATENT DOCUMENTS 5,204,045 A    4/1993   Courval et al.
7,341,285 B2   3/2008   McPherson
(Continued)

FOREIGN PATENT DOCUMENTS

CN    101687362 A    3/2010
EP    1242220 B1     5/2004
(Continued)

OTHER PUBLICATIONS

Newson, William R. and Frank W. Maine. "Second Generation Woodfibre-Polymer Composites." Progress in Woodfibre-Plastic Composites—2002. May 23-24, 2002.*
(Continued)

*Primary Examiner* — Nancy R Johnson
(74) *Attorney, Agent, or Firm* — McGarry Bair PC

(57) ABSTRACT

An oriented plastic composition (OPC) shaped article having a length, width and thickness dimension in which the width and thickness dimensions are less than that of the length dimension, having at least one surface that can be machined so that a portion of the OPC shaped article is reduced in the width or thickness dimension along at least a portion of the length of the article and a process for making and machining an OPC shaped article.

18 Claims, 6 Drawing Sheets

(51) Int. Cl.
  *B29C 55/30* (2006.01)
  *B29C 59/00* (2006.01)
  *B29C 59/02* (2006.01)
  *C08K 3/26* (2006.01)
  *C08K 3/34* (2006.01)
  *C08L 23/06* (2006.01)
  *B29K 23/00* (2006.01)
  *B29K 105/00* (2006.01)
  *B29K 105/16* (2006.01)
  *B29K 105/26* (2006.01)
  *B29K 509/00* (2006.01)
  *B29L 31/00* (2006.01)
  *B29L 31/10* (2006.01)

(52) U.S. Cl.
  CPC ...... *B29K 2023/06* (2013.01); *B29K 2023/12* (2013.01); *B29K 2105/0088* (2013.01); *B29K 2105/16* (2013.01); *B29K 2105/26* (2013.01); *B29K 2509/00* (2013.01); *B29K 2995/0097* (2013.01); *B29L 2031/003* (2013.01); *B29L 2031/10* (2013.01); *C08L 2205/025* (2013.01); *C08L 2205/03* (2013.01); *C08L 2207/20* (2013.01); *Y10T 428/24479* (2015.01)

(58) Field of Classification Search
  CPC ............ B29K 2509/00; B29K 2105/16; B29K 2105/26; B29K 2105/088; B29L 2031/10; B29L 2031/003
  See application file for complete search history.

(56) References Cited

U.S. PATENT DOCUMENTS

| | | |
|---|---|---|
| 2003/0224147 A1 | 12/2003 | Maine et al. |
| 2007/0289249 A1 | 12/2007 | Martel |
| 2008/0111278 A1 | 5/2008 | Nichols et al. |
| 2008/0115437 A1 | 5/2008 | Bordener |
| 2008/0287576 A1* | 11/2008 | Nichols ................. B29C 55/005 524/65 |
| 2009/0001629 A1 | 1/2009 | Newson et al. |
| 2009/0155534 A1 | 6/2009 | O'Brien et al. |
| 2009/0176898 A1* | 7/2009 | Nichols ............... B29C 47/0021 521/50 |
| 2014/0203472 A1* | 7/2014 | Benjamin ........... B29C 47/0019 264/164 |

FOREIGN PATENT DOCUMENTS

| | | |
|---|---|---|
| WO | 1998020545 A1 | 5/1998 |
| WO | 1998020546 A1 | 5/1998 |
| WO | 2004101251 A1 | 11/2004 |
| WO | 2013003490 A1 | 1/2013 |

OTHER PUBLICATIONS

Newson, William R. and Frank W. Maine. "Oriented Polypropylene Composites made with Mica." 8th International Conference on Woodfibre-Plastic Composites, Madison, Wisconsin, May 23-25, 2005.*
Chang Ho Lee, International Search Report, dated Sep. 17, 2014, 8 pages, Republic of Korea.
James Benes, Cutters for Plastics, American Machinist, 5 pages, Oct. 13, 2009, http://americanmachinist.com/features/cutters-plastics.
Van Niser, Routing: Routing & Trimming Polypropylen, The Plastics Distributor & Fabricator, 4 pages, Mar./Apr. 2008, LaGrange, Illinois, http://www.plasticsmag.com/routing.asp?fIssue=Mar/Apr-08&aid=4741.
Bob Warfield, Dealing with Chatter When Milling, CNC Feeds and Speeds Cookbook, 8 pages, All material 2010-2014, http://www.cnccookbook.com/CCCNCMillFeedsSpeedsChatter.htm.
Article Index, Your Guide to Tear-Out, Popular Woodworking Magazine, Dec. 12, 2012, 4 pages, http://www.popularwoodworking.com/techniques/your-guide-to-tear-out.
Ajii, A. et al, "Solid State Extrusion and Die Drawings", Solid Phase Processing of Polymers, p. 347, Hanser Publishers, Munich 2000 (4 pgs).
European Search Report dated Dec. 14, 2016, 6 pps.

* cited by examiner

PLASTICS-BASED MANUFACTURED ARTICLE AND PROCESS FOR FORMING

CROSS-REFERENCE TO RELATED APPLICATIONS

This application claims the benefit of U.S. Provisional Patent Application No. 61/826,120, filed May 22, 2013, which is incorporated herein by reference in its entirety.

TECHNICAL FIELD

This invention relates generally to building products and more particularly to articles that are made by molding, planing (also referred to as thicknessing), or routering of oriented plastic composite articles and to processes for making such products.

BACKGROUND

Wood as a trim material in exterior building applications has many excellent qualities. It is a naturally occurring material that is durable and strong, yet with some flexibility. It can be machined using a saw, a lathe, a router or other common wood machining equipment. Wood surfaces can be decorated to give a variety of appearances desired by a consumer. However, it is also susceptible to adverse effects from exposure to sunlight and moisture. High quality lumber necessary for creating shaped articles for trim pieces has also become relatively scarce and expensive.

For these reasons, plastics have been used in a number of applications in the building industry as a wood replacement, particularly in exterior applications. Common, high volume exterior applications include cladding and windows for which the use of "vinyl" (polyvinyl chloride) is well known. The use of plastics as a wood replacement is also known in doors, decks, fences, and in other applications. However, intricate shaped articles, including decorative moldings, door jambs and the like, which can require round surfaces, sharp angles, inside corners, undercuts and other difficult to fabricate shapes, have not been readily replaced by plastics because the manufacture of intricate plastic shaped articles has not been cost effective. Generally, intricate shapes can only be produced by expensive fabrication methods, for example injection molding, precise profile extrusion, machining, or other techniques designed for expensive engineered parts. The required intricate shapes, with all of the functionality required, have not been readily and cost-effectively produced from low cost plastics by known low cost methods of processing using, for example, common wood working routers, planers (thicknessers), molders and the like.

Machining of some plastics is known and can be used to produce intricate shapes and dimensional tolerances that cannot be readily fabricated into plastic parts using other means. As summarized in the March/April 2008 on-line issue of Plastics Distributor® & Fabricator Magazine some of the challenges typically encountered during machining of plastics, such as polypropylene, include re-weldment or wrap-around of waste material on the cutting tool and difficulty in obtaining the desired surface finish. One suggested method for addressing these challenges includes using machine tools which produce larger chips, such as slow helix tools. In addition, because of the sometimes gummy nature of polypropylene and the inherent heat generated by the cutting action during machining, it is recommended that high-speed steel tools not be used. A trial and error process of increasing feed rate through the machine and slower spindle speeds for the tool can be used to attempt to achieve an acceptable finish on the work article.

Typically, the fabricator (machine operator) is given a thermoplastic material that may have been designed for a particular engineering application and filled with a reinforcing material, for example, glass fiber. In these situations, the thermoplastic material is typically chosen for the end use and not necessarily to facilitate machining of the plastic. Furthermore, the work piece is typically held in a fixed position and the machining tool moved to produce the desired shape. As a result, the machining process can be slow and the parts small compared to the size of parts that would typically be needed for use as wood substitute in building applications. For these reasons, the engineering thermoplastics used for these machined applications can be too costly for application as wood substitutes in building applications.

Recently, wood filled thermoplastic composites have been introduced as wood substitutes in decking, cladding and simple trim applications that do not require intricate shapes. These composites are typically produced by profile extrusion and, depending on the material and the difficulty of producing the shape, may be expensive. Also, many desirable shapes for shaped articles may not be successfully produced with the dimensional consistency required when using desirable inexpensive thermoplastic materials. In other applications, profile extrusion may be too expensive to provide parts with the low dimensional variability (tight tolerances) preferred for use in applications such as support boards for extruded aluminum door sills or thresholds. Moreover, there are a number of challenges for these wood plastic composite parts for many wood replacement applications, including, but not limited to, aesthetics, toughness (elastic and flexural modulus), and machinability.

Extruded plastic composite materials are now in use as deck boards and the like. However, these also can have drawbacks as a raw material for intricate shaped articles. Products made from extruded cellulose filled polyethylene, polypropylene or polyvinyl chloride, often referred to as wood plastic composites, are readily available as deck boards. However, they have undesirable sensitivity to moisture, and in some cases, exposure to sunlight. Many of these can suffer from "blow-out" when screws are inserted into the ends of extruded boards; the ends can tend to "blow out", (a chunk of material breaks away), because the material may be brittle. The plastic composite materials may also be very heavy relative to wood and can add substantial weight and cost to the application. Use of foaming to decrease the weight and cost can make the plastic composite, especially wood plastic composites, even more prone to "blow out". Finally, wood has very low coefficient of thermal expansion (CTE), approximately one-tenth the CTE of typical wood plastic composite materials. In some building exterior applications that are constrained, for example, in a door threshold support, this can lead to bending or bowing of the constrained piece.

Filled oriented polymer composition (OPC) articles produced from solid state die drawing are also known for use as wood substitutes. A major challenge for solid state die drawing is that intricate shapes and dimensions are not readily drawn into the final part. Inside corners with sharp features, channels with sharp features, undercuts, etc., can be very difficult to achieve with die drawing. Thus, for shaped articles for building applications, for example, decorative trim pieces, coving, brick molding, door jambs, etc., machining (planer/molder/routers) is necessary to achieve the desirable shapes and dimensions. Another challenge encountered in the machining or cutting of OPC articles is surface fibrillation, which can result from the "tear-out" of oriented polymer strands during various types of cutting operations on an oriented polymer composition article. Fibrillation of the surface can occur when an OPC article is cut as with a saw or is machined by any of a number of wood working techniques, for example, routering, molding and the like. "Tear-out" is when, during the machining process, a fibril or cluster of fibrils is produced at the cut or machined surface which, when pulled, can peel or "chip" away from neighboring aligned polymer chains leaving a gap in the surface.

U.S. Pat. No. 5,204,045 to Courval et al. addresses surface fibrillation in OPCs by creating a skin of low orientation. Another example, U.S. Pub. No. 2009/0155534, to O'Brien et al., describes an alternate method of addressing surface fibrillation by applying a surface treatment which results in a deoriented surface layer and reduced fibrillation when the article surface is cut or scratched. The surface layer is from 80 to 400 microns in thickness and is of lower orientation than a 100 microns thick layer adjacent to the deoriented surface layer. However, in both cases, surface fibrillation is only addressed within a predetermined depth from the surface of the article.

SUMMARY

According to an embodiment of the invention, an article is formed from an oriented polymer composition (OPC) throughout its entire volume and having length, width and thickness dimensions in which the width and thickness dimensions are less than that of the length dimension, wherein at least one surface has been machined so that a portion of the article is reduced in at least one of the width or thickness dimension along at least a portion of the length dimension of the article and wherein a density of the article is between about 0.5 g/cc and 1.0 g/cc.

According to another embodiment, the article further comprises at least one filler. The at least one filler can be an inorganic filler, organic filler or a combination of both and comprise 25 wt % to 60 wt % of the article.

Additional embodiments of the article include one or more of the following: the flexural modulus of the article is between 0.60 and 5.5 GPa; the OPC comprises polyethylene, polypropylene, recycled polyethylene or recycled polypropylene, or a combination thereof; and the Shrink Ratio is 0.25 or greater and less than 0.8.

According to another embodiment, the article comprises at least one surface that has been machined so that the article is reduced in at least one of the width or thickness dimension along at least a portion of the length dimension by at least 5% compared to a maximum width or thickness dimension of the article, respectively. In another embodiment, the at least one surface has been machined so that a portion of the article is reduced in at least one of the width or thickness dimension along at least a portion of the length dimension of the article by at least 400 microns compared to a maximum width or thickness dimension of the article, respectively. Still further, the reduction in at least one of width or thickness along at least a portion of the length dimension of the article can form an external profile on the article useful as an interior or exterior trim component in building applications.

In yet another embodiment, the at least one machined surface is free of defects visible to the unaided eye.

According to an embodiment of the invention, a building structure includes at least one component comprising the article. The article can be present as a component of an assembly for a window, door, or fenestration opening.

In another embodiment, a process for making a machine-shaped article from an oriented polymer composition (OPC), the machine-shaped article being formed from the OPC throughout its entire volume, comprises (a) providing a temperature conditioned extruded polymer composition to a solid state drawing die; (b) drawing the polymer composition at a linear draw ratio less than 7.0 to produce an OPC work piece; (c) providing the OPC work piece to a machining device comprising one or more machine tools; and (d) machining the OPC work piece to produce a surface that has been reduced in thickness by removal of material using machining tools to produce an OPC machine-shaped article.

Additional embodiments of the invention comprise one or more of the following: the polymer composition is die drawn so that the linear draw ratio is between 2.5 and 6.5; the rotational speed of at least one of the one or more machine tools is between 2000 RPM and 12,000 RPM; multiple machine tools accomplish the trimming and machining of the OPC work piece in one pass through the machine tools; the OPC machine-shaped article comprises an inorganic filler; the process is a semi-continuous or continuous process; machining the OPC work piece comprises reducing at least one surface of the article in thickness by removal of material using machining tools to a depth of at least 400 microns; and the OPC machine-shaped article is free of surface defects visible to the unaided eye.

In another embodiment, the process further comprises trimming the OPC work piece to an initial cross-section dimensions prior to providing the OPC work piece to the machining device.

BRIEF DESCRIPTION OF THE DRAWINGS

These and other features and advantages of the present invention will become better understood to those of ordinary skill in the art when considered in connection with the following description and drawings.

DESCRIPTION OF THE EMBODIMENTS OF THE INVENTION TERMS

Figure 1A:
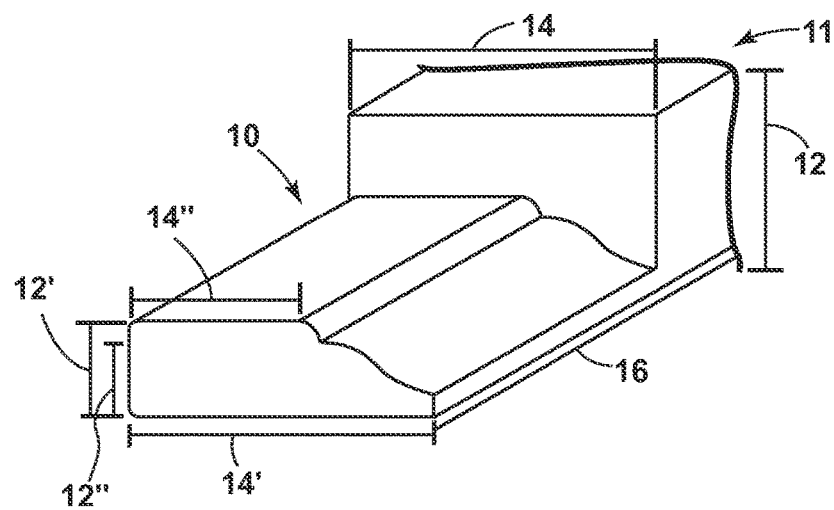
FIG. 1A is a perspective view of an OPC shaped article formed from an OPC work piece according to an embodiment of the invention.

"Solid state" refers to a polymer (or polymer composition) that is below the softening temperature of the polymer (or polymer composition). Hence, "solid state drawing" refers to drawing a polymer or polymer composition that is below the softening temperature of the polymer (or polymer composition). "Solid state die drawing" refers to drawing a polymer or polymer composition that is below its softening temperature through a shaping die.

"Polymer composition" comprises at least one polymer component and can contain non-polymeric components. A "filled" polymer composition includes discontinuous additives, such as inorganic or organic fillers.

An "orientable polymer" is a polymer that can undergo induced molecular orientation by solid state deformation (for example, solid state drawing). An orientable polymer can be amorphous or semi-crystalline (semi-crystalline polymers have a melt temperature (Tm) and include those polymers known as "crystalline"). Desirable orientable polymers include semi-crystalline polymers, and in particular, linear polymers (polymers in which chain branching occurs in less than 1 of 1,000 polymer units). Semi-crystalline polymers can be particularly desirable because they can result in greater increase in strength and flexural modulus than amorphous polymer compositions. Semi-crystalline polymer compositions can result in 4-10 times greater increase in strength and flexural modulus upon orientation over amorphous polymer compositions.

An "orientable polymer phase" is a polymer phase that can undergo induced molecular orientation by solid state deformation (for example, solid state drawing). Typically, 75 wt % or more, even 90 wt % or more or 95 wt % or more of the polymers in the orientable polymer phase are orientable polymers based on total orientable polymer phase weight. All of the polymers in an orientable polymer phase can be orientable polymers. An orientable polymer phase may comprise one or more than one type of polymer and one or more than one type of orientable polymer.

"Oriented polymer composition article", "OPC" and "oriented polymer composition" are interchangeable and refer to an article made by orienting the polymers of a polymer composition. An oriented polymer composition comprises polymer molecules that have a higher degree of molecular orientation than that of a polymer composition extruded from a mixer.

"Weight-percent" and "wt %" are interchangeable and are relative to total polymer weight unless otherwise stated.

"Softening temperature" (Ts) for a polymer or polymer composition having as polymer components only one or more than one semi-crystalline polymer is the melting temperature for the for the continuous phase polymer in the polymer composition.

"Melting temperature" (Tm) for a semi-crystalline polymer is the temperature half-way through a crystalline-to-melt phase change as determined by differential scanning calorimetry (DSC) upon heating a crystallized polymer at a specific heating rate. Tm for a semi-crystalline polymer can be determined according to the DSC procedure in ASTM method E794-06. Tm for a combination of polymers, and for a filled polymer composition, can also be determined by DSC using the same test conditions in ASTM method E794-06. If the combination of polymers or filled polymer composition only contains miscible polymers and only one crystalline-to-melt phase change is evident in the a DSC curve, then Tm for the polymer combination or filled polymer composition is the temperature half-way through the phase change. If multiple crystalline-to-melt phase changes are evident in a DSC curve due to the presence of immiscible polymers, then Tm for the polymer combination or filled polymer composition is the Tm of the continuous phase polymer. If more than one polymer is continuous and they are not miscible, then the Tm for the polymer combination or filled polymer composition is the highest Tm of the continuous phase polymers.

"Softening temperature" (Ts) for a polymer or polymer composition having as polymer components only one or more than one amorphous polymer is the glass transition temperature for the continuous phase of the polymer composition.

If the semi-crystalline and amorphous polymer phases are co-continuous, then the softening temperature of the combination is the lower softening temperature of the two phases. If the polymer composition contains a combination of semi-crystalline and amorphous polymers, the softening temperature of the polymer composition is the softening temperature of the continuous phase polymer of the polymer composition.

"Glass transition temperature" (Tg) for a polymer or polymer composition is the temperature half-way through a glass transition phase change as determined by DSC according to the procedure in ASTM method D3418-03. Tg for a combination of polymers and for a filled polymer composition can also be determined by DSC under the same test conditions in D3418-03. If the combination of polymer or filled polymer composition only contains miscible polymers and only one glass transition phase change is evident in the DSC curve, then Tg of the polymer combination or filled polymer composition is the temperature half-way through the phase change. If multiple glass transition phase changes are evident in a DSC curve due to the presence of immiscible amorphous polymers, then Tg for the polymer combination or filled polymer composition is the Tg of the continuous phase polymer. If more than one amorphous polymer is continuous and they are not miscible, then the Tg for the polymer composition or filled polymer composition is the highest Tg of the continuous phase polymers.

If the polymer composition contains a combination of semi-crystalline and amorphous polymers, the softening temperature of the polymer composition is the softening temperature of the continuous phase polymer or polymer composition.

"Drawing temperature" refers to the temperature of the polymer composition as it begins to undergo drawing in a solid state drawing die.

"Linear Draw Ratio" is a measure of how much a polymer composition elongates in a drawing direction (direction the composition is drawn) during a drawing process. Linear draw ratio can be determined while processing by marking two points on a polymer composition spaced apart by a pre-orientated composition spacing and measuring how far apart those two points are after drawing to get an oriented composition spacing. The ratio of final spacing to initial spacing identifies the linear draw ratio.

"Nominal draw ratio" is the cross sectional surface area of a polymer composition as it enters a drawing die divided by the polymer cross sectional area as it exits the drawing die.

"Machining device", "machine tool" or "machining tooling" are used interchangeably. A "machine tool" is a stationary, power-driven machine used to cut, shape, or form materials such wood, which in this instance, is used to cut, shape, or form oriented polymer compositions. "Machining" means to shape or finish by turning, shaping, planing (thicknessing), molding, routering or milling by machine-operated tools where the "tool" refers to the cutting or shaping part in a machine or machine tool.

"Machining temperature" refers to the temperature of the oriented polymer composition article work piece, as it begins to undergo machining, by a tool in the machining process.

"Machining rate" refers to the rate in units of length per unit time at which the work piece is moved past a machine tool working on the work piece.

"Work piece" is generally defined as material that is in the process of being worked on or made or has actually been cut or shaped by a hand tool or machine. For the purposes of this invention, "work piece" refers to an oriented polymer composition, particularly, an oriented polymer composition board after having exited the drawing die and prior to, during, or after its being fabricated or "worked" by being machined by the machining tools of the process of the invention. "Work piece blank" refers to a work piece that has been trimmed to a desired cross section, but not yet machined using high speed machining tools.

A "tear-out" in a worked fibrous surface results when fibers on the surface are lifted by the wedge or plane of the tool, as opposed to being cut (sheared) off, resulting in a jagged finish. A "gouge" is similar to a tear out in appearance but results from excessive penetration of a tool into the work piece, for example, from tool chatter.

"Defects" in the context of the machined surface of the OPC article includes, but is not limited to: gouges, tear-outs and fibrils all of which are visible to the unaided eye.

"Visible to the unaided eye" means that a person at a viewing distance of at least 1.0 meter or greater can distinguish individual features, for example, fibers, gouges or tear-outs, on the surface of the article without using a device which magnifies surface features.

An OPC is "similar" to another OPC if its composition is substantially the same as the other OPC in all respects except those noted in the context where the similar OPC is referenced. Compositions are substantially the same if they are the same within reasonable ranges of process reproducibility.

"ASTM" refers to ASTM International, formerly American Society for Testing and Materials; the year of the method is either designated by a hyphenated suffix in the method number or, in the absence of such a designation, is the most current year prior to the filing date of this application.

"Revolutions per minute" and RPM are interchangeable and refer to the number of times a rotating tool revolves around its rotational axis in one minute.

"Multiple" means at least two.

"And/or" means "and, or as an alternative."

Ranges include endpoints unless otherwise stated.

Temperatures are given in degrees Celsius, abbreviated as "C" unless otherwise stated.

Shrink Ratio is measured by cutting a shaped OPC article to an initial length $L_{init}$ typically between 4 in (10 cm) and 10 in (25 cm), placing the piece in a preheated oven at 180 degrees Celsius for one hour, removing the piece from the oven, allowing it to cool and recording the final length $L_{fin}$. The Shrink Ratio (SR) is defined by equation (1) below:

$$SR = L_{fin}/L_{init} \quad \text{(Equation 1)}$$

Flexural modulus is measured according to ASTM method ASTM D-6109-05

Density is measured according to ASTM method ASTM D-792-00

Figure 5A:
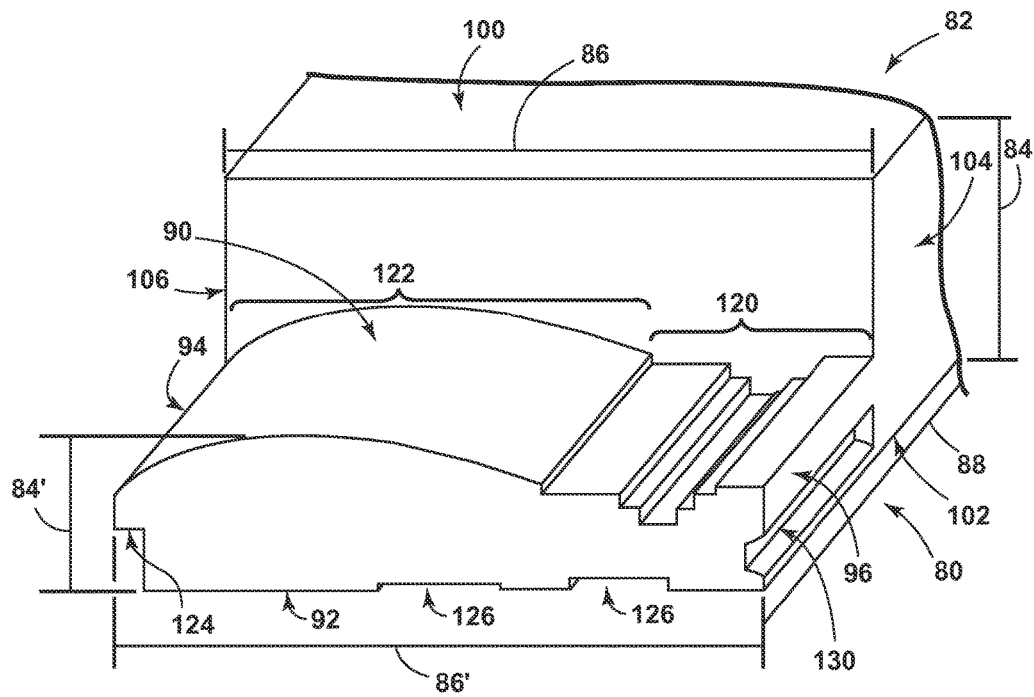
FIG. 5A is a perspective view of an OPC shaped article formed from an OPC work piece according to an embodiment of the invention.
Figure 5B:
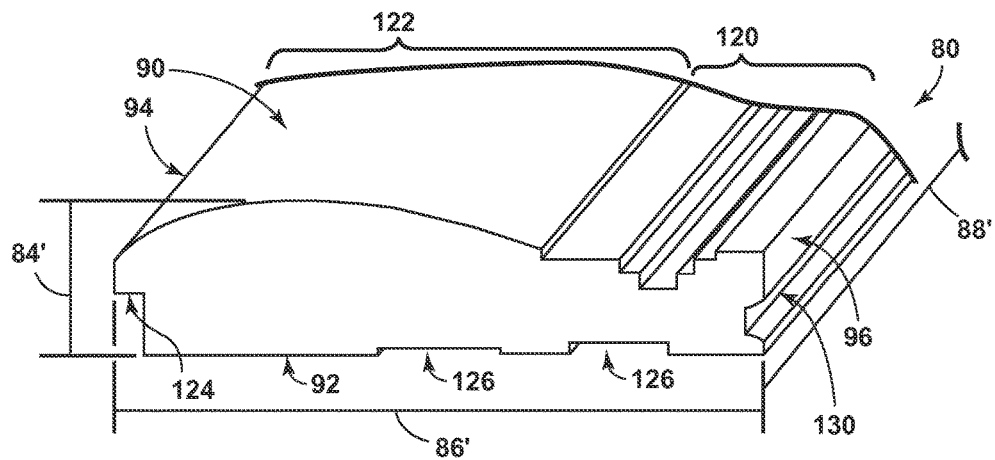
FIG. 5B is a perspective view of an OPC shaped article according to an embodiment of the invention.

FIGS. 1A-1B, 2A-2B, 3A-3B, and 4A-4B illustrate non-limiting examples of exemplary shaped OPC articles 10 according to an embodiment of the invention. The shaped articles 10 illustrated in FIGS. 1A-1B, 2A-2B, 3A-3B, and 4A-4B are examples of articles having decorative trim features such as rounded or curve shapes, flat surfaces machined onto one or more than one of the surfaces of a work piece having a variety of different initial dimensions. FIGS. 5A-5B illustrate one non-limiting example of a shaped OPC article 80 in the form of a support board for an extruded aluminum door threshold.

Referring now to FIG. 1A, a shaped OPC article 10 is formed from an OPC work piece 11 having an initial thickness 12, a width 14 and a length 16. The length 16 is typically greater than the width 14 and the width 14 is typically greater than the thickness 12, although it is also within the scope of the invention for the thickness 12 to be greater than the width 14 or the same as the width 14. The initial dimensions of thickness, width and length 12, 14, and 16, respectively, can vary depending on the needs of the user. The work piece 11 may be machined to any shape that can be produced using typical wood-working routers, molding machines or planers (thicknessers) or combinations of these machines to provide the shaped OPC article 10 having a maximum thickness 12', a maximum width 14' and a maximum length 16'. The shaped OPC article 10 is formed by machining the OPC work piece 11 to reduce the initial width 14 and/or thickness 12 along at least a portion of the length 16 of the OPC work piece 11. The final shape and dimensions of the OPC article 10 may be determined using one or more machines during one or more processes.

Figure 1B:
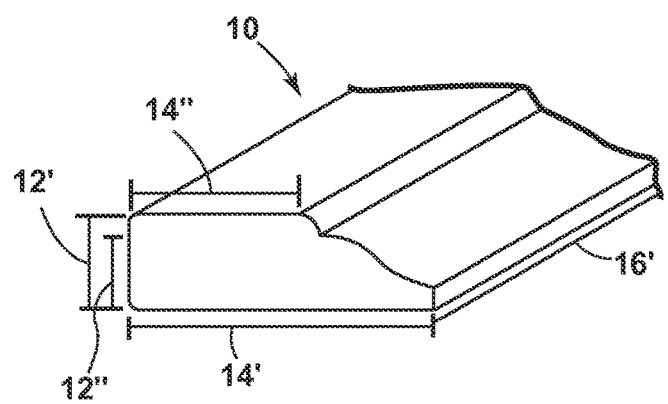
FIG. 1B is a perspective view of an OPC shaped article according to an embodiment of the invention.
Figure 2A:
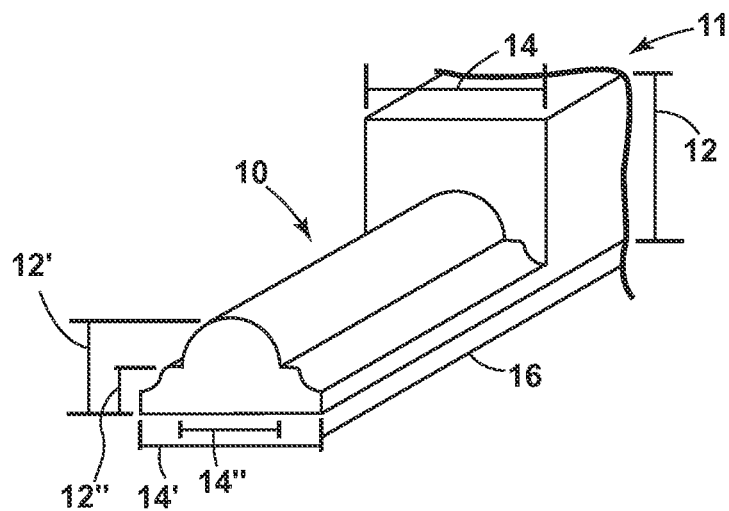
FIG. 2A is a perspective view of an OPC shaped article formed from an OPC work piece according to an embodiment of the invention.
Figure 2B:
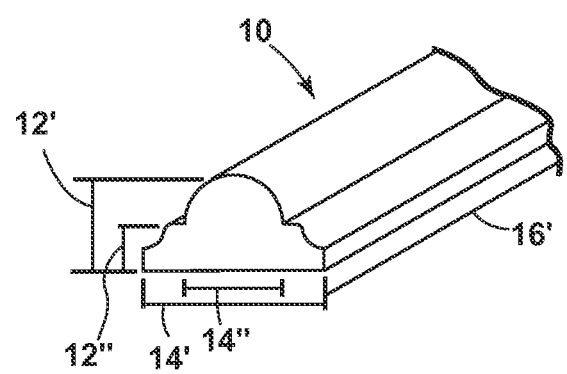
FIG. 2B is a perspective view of an OPC shaped article according to an embodiment of the invention.
Figure 3A:
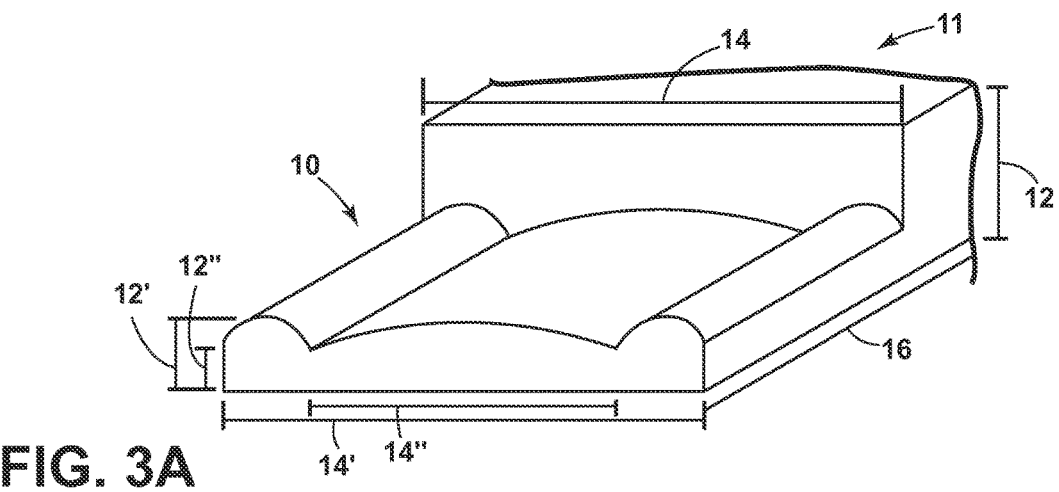
FIG. 3A is a perspective view of an OPC shaped article formed from an OPC work piece according to an embodiment of the invention.
Figure 3B:
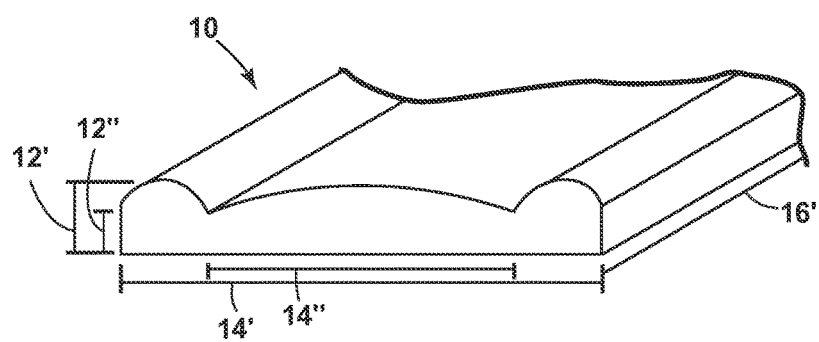
FIG. 3B is a perspective view of an OPC shaped article according to an embodiment of the invention.
Figure 4A:
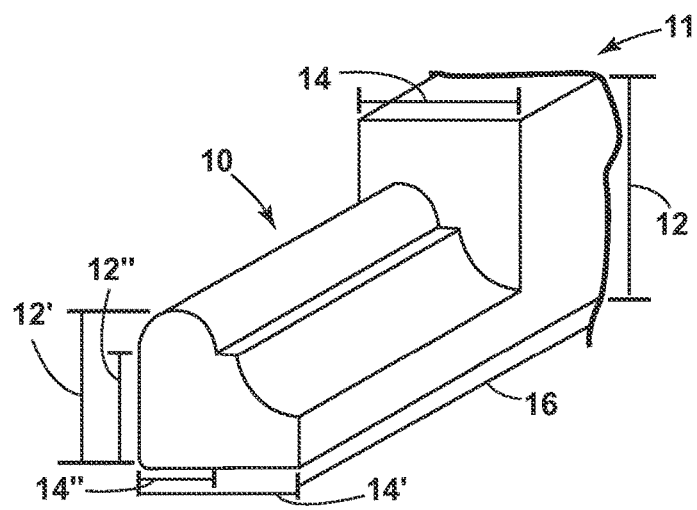
FIG. 4A is a perspective view of an OPC shaped article formed from an OPC work piece according to an embodiment of the invention.
Figure 4B:
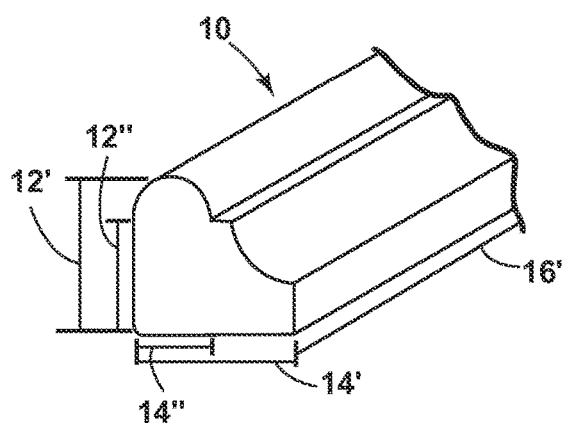
FIG. 4B is a perspective view of an OPC shaped article according to an embodiment of the invention.

The OPC work piece 11 can be machined to provide the shaped OPC article 10 with a symmetric or asymmetric contour having any combination of angles, curves and planes in a manner similar to that which can be done with real wood. As illustrated in FIG. 1, the OPC work piece 11 has been machined to provide the shaped OPC article 10 with thicknesses 12' and 12" and widths 14' and 14" that are less than the original thickness 12 and width 14 of the OPC work piece 11. The contour of the OPC shaped article 10 can be created using one or more machining processes and tools to reduce the thickness 12 and width 14 of the OPC work piece 11 to provide the desired OPC shaped article 10 having the desired length 16', as illustrated in FIG. 1B.

FIGS. 2A-2B, 3A-3B and 4A-4B illustrate additional exemplary embodiments of forming a shaped OPC article 10 having a symmetric or asymmetric contour having combination of angles, curves and planes by reducing the thickness 12 and width 14 along at least a portion of the length 16 of the OPC work piece 11. As illustrated in FIGS. 1A-B through 4A-B, shaped OPC articles 10 having a variety of different combinations of angles, curves, and planes in a variety of different dimensions can be formed from OPC work pieces 11 having a variety of different initial dimensions in a manner similar to how real wood pieces can be machined to form shaped articles.

Referring now to FIGS. 5A and 5B, an OPC work piece 82 having an initial thickness 84, width 86 and length 88 can be machined to provide the shaped OPC article 80 having a maximum thickness 84', width 86' and length 88' in a manner similar to that described above for the OPC shaped article 10 of FIGS. 1-B through 4A-B. The maximum length 88' of the shaped OPC article 80 may be any suitable length as needed by the shaped article installer and may be produced in lengths typically used commercially, for example, six feet (1.83 meters) eight feet (2.43 meters), ten feet (3.05 meters), or even 20 feet (6.1 meters) or more and may be cut to size as needed. The width 86 of the OPC work piece 82 prior to being machined may range from as little as about one or two inches (2.5 to 5 cm) and is typically less than 6 inches (15 cm) but may be as large as 12 inches (30.5 cm). The thickness 84 of the shaped OPC article 80 prior to being machined may range from ⅛ inch (3.18 mm) to 2 inches (5 cm) or more. As described above, the shaped OPC article 80 may be machined to any shape that can be produced using typical wood-working routers, molding machines or planers (thicknessers) or combinations of these machines.

During a typical wood-working type machining process, the depth of cut can vary over the thickness, width and/or length of the work piece and may be limited to one side or multiple sides of the work piece. In some portions of the work piece, the depth of cut can be through the entire thickness or width of the work piece whereas other portions of the work piece can be free of any cut or have only a small portion of material removed. Generally, in a wood-working type machining process, the depth of cut can be any desired distance and is usually greater than 0.25 mm, 0.5 mm, 1 mm, 5 mm, 10 mm, 1 cm or 2 cm or more. The depth of cut can be as great as the full thickness or width of the work piece. As used herein, the depth of cut refers to a distance orthogonal to a surface to which a cutting tool penetrates to remove material during a machining process, such as cutting, for example.

The shaped OPC article 80 has faces, which can comprise machined and un-machined sections, such as a top face 90, a bottom face 92 and a pair of opposing side faces 94, 96. At least one face of a top face 100, bottom face 102, and opposing side faces 104, 106 of the OPC work article 82 is machined to produce the curves, angles, and planes of the shaped OPC article 80. For example, section 120 illustrates a section formed by linear machining of the top face 100 of the OPC work article 82 to form a series of stepped portions in the top face 90 of the shaped OPC article 80, while section 122 illustrates a curved machined section in the top face 90 of the shaped OPC article 80 that is machined from the top face 100 of the OPC work article 82. An "undercut" 124 in the side face section 94 of the shaped OPC article 80 illustrates another exemplary type of machine cut. Grooves 126 and 130 in the bottom face 92 and the side face 96 of the shaped OPC article 80, respectively, illustrate additional examples of machine cuts. The shaped OPC article 80 can include any combination of un-machined and machined or cut sections in one or more faces 90, 92, 94, and 96, as is known in the art of wood working. The faces 90, 92, 94, and 96 of the shaped OPC article 10 can be relatively smooth from die drawing, heating, sanding, sawing and/or trimming or other machining operations.

Figure 6:
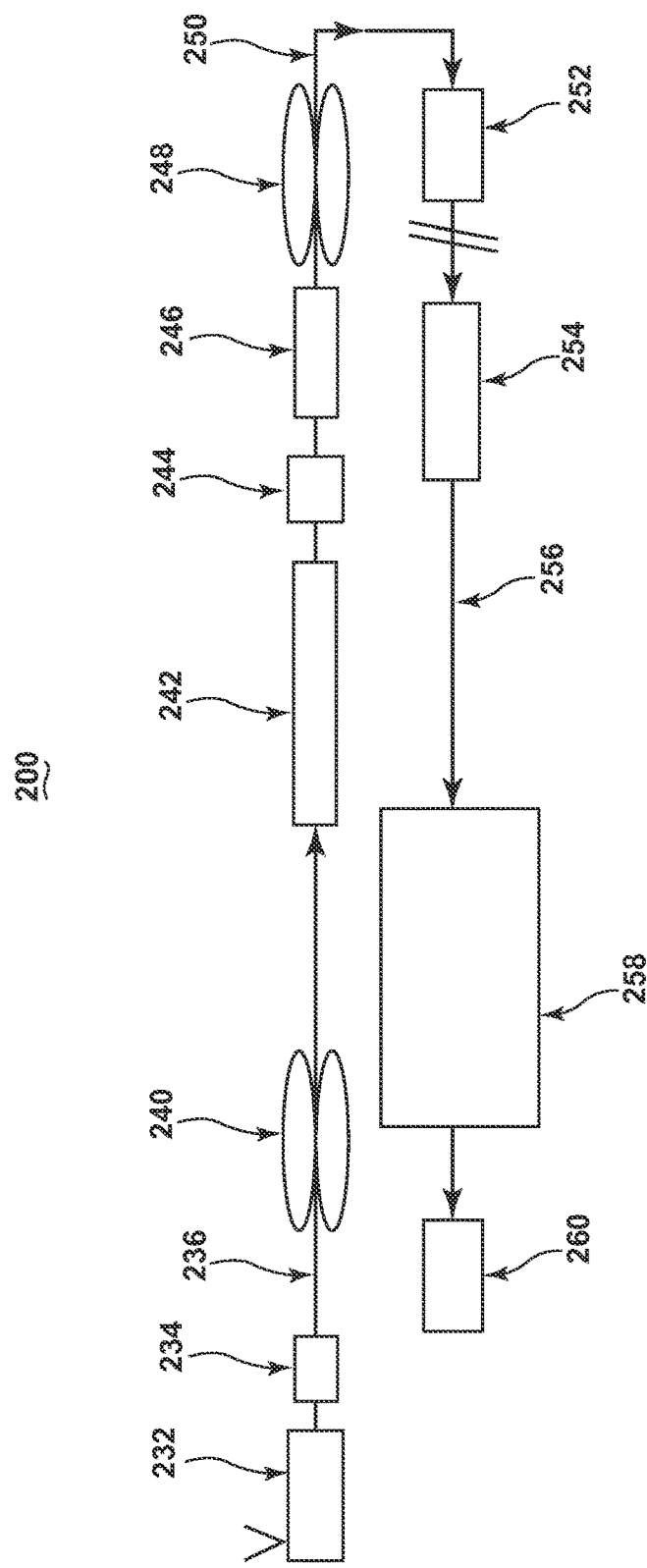
FIG. 6 illustrates a process for fabricating oriented polymer composition work pieces and shaped articles according to an embodiment of the invention.

FIG. 6 illustrates an exemplary process 200 that can be used for fabricating a shaped OPC articles, such as the shaped OPC articles 10 and 80. The sequence of steps depicted for this process and the subsequent methods are for illustrative purposes only, and are not meant to limit any of the methods in any way as it is understood that the steps may proceed in a different logical order or additional or intervening steps may be included without detracting from the invention.

Selected plastics materials and additives are introduced to an extruder 232 as a pre-compounded material or as individual components, or as a combination of the two, and, after processing in the extruder 232, are extruded through a die and calibrator 234 to produce a hot billet (extrudate) 236 of the extruded material which is moved by a puller (caterpillars, belts, rollers, or other means) 240 to a temperature conditioning stage 242, where the material is cooled below its softening temperature Ts. The cooled extrudate is then drawn through a solid state die draw stage 244 through a die at a drawing temperature to align long chains of the polymer in the lengthwise direction of drawing using a puller 248 and cooled with a cooling tank 246 to a cutting temperature to form an OPC work piece 250. The OPC work piece 250 is subsequently fed using pullers or other means to a saw 252, as is known in the art, to cut the OPC work piece 250 to a desired length. The OPC work piece 250 is optionally trimmed at a cutting station 254 to a desirable width and thickness to create an OPC machine blank 256 for further machining at machining station 258 to form a shaped OPC article 260, wherein the OPC machine blank 256 is continuously fed to the machining station 258 as part of a continuous process. Additional steps may be utilized to further prepare the OPC work piece 250 for machining including trimming, for example, to make sure the cross-sectional dimensions are perpendicular to one another along the length of the OPC work piece 250. The trimming step can be as a separate step or accomplished in the multi-cutter machining station with a set of cutters designed for the purpose as is common with wood-working "molding machines".

In another embodiment, the cut or sawn OPC work pieces 250 may be stored after cutting or after initial trimming and prior to subsequent trimming or molding steps. Then, the stored pieces may be subsequently trimmed and molded or only molded, as necessary, as part of a semi-continuous process.

The machining station 258 can comprise a machining device, for example, a router, molding machine, or planer (thicknesser) or any other machining device used in woodworking. The machining station 258 can include tools that can be rotating tools, which can remove material by cutting chips from the surface of the OPC machine blank 256. The number of tools and their placement with respect to the OPC machine blank 256, the tool rotation speed (RPM), tool cutting angle, material of construction, and the like, can be chosen by the engineer or machinist of skill in the art to produce the desired shaped product with the desired surface finish, such as a surface which is free of defects, e.g. gouges, tear-out or fibers, visible to the unaided eye.

The cutting edge of the machine tool may be tool steel or carbide or diamond edged as is known in the art. The operating conditions for a particular machining operation depends on a variety of factors non-limiting examples of which include the material used to form the OPC machine blank 256, the type of tool used at the machining station 258, cutting angle of the tool edge with respect to the OPC machine blank 256, tool speed (rpm), spindle diameter (which affects linear speed of the rotating tool), and OPC machine blank 256 temperature. For example, tool speeds can be as low as a few thousand rpm, e.g., 2000 RPM, 4000 RPM or 6000 RPM or as high as 8000, 10,000, 12,000 or even 15,000 RPM or more depending on the factors noted. However, the energy demand of the machine (horsepower requirement) required to power the tools can increase as the feeding rate of product through the machine increases and as the RPM required to make a smooth cut increases. Thus, it is preferred to be able to machine an OPC machine blank 256 at the lowest RPM that gives an acceptable surface at the throughput rate desired. Multi-head machines having multiple machining heads can also be used for machining and/or trimming in one pass. Preferable multi-head machines can have tool rotational speeds between 5000 and 12000 RPM, typically 6,000 to 8,000 RPM. Throughput rates may be as low as one or two meters per minute (m/min) or as high as 25, 50 or 75 or more meters per min.

Energy demand can also increase as more material is removed as the depth of cut is increased. Machining to produce an OPC shaped article can typically remove 5% or more, 10%, 20%, 30%, 40% 50%, and even 60% or more and as much as 80% or more of the thickness of an OPC machine blank on at least a portion of the finished decorative shaped article compared to the maximum thickness of the OPC shaped article.

It is preferred that the machining temperature at the machining station 250 is below the softening temperature of the polymer composition used to form the OPC machine blank 256 so that that the OPC machine blank 256 can be cut by the sharp edge of a machine tool, rather than deformed as if pushed by the tool, during the machining process at machining station 250. Furthermore, it may be preferred for a continuous machining operation, that the characteristics of the machined surface be relatively insensitive to the machining temperature so that upsets or changes in other parts of the process have no, or only a limited effect, on the machining process and product characteristics.

In an exemplary embodiment, the OPC shaped article 260 can be made from an oriented polymer composition comprising a continuous phase of one or more orientable polymers. Preferably, 90 wt % or more, and more preferably, 95 wt % or more of the polymers in the polymer composition are orientable polymers. Alternatively, all of the polymer in the polymer composition can be orientable.

As described above, an orientable polymer is a polymer that can undergo polymer alignment. Orientable polymers can be amorphous or semi-crystalline. Herein, "semi-crystalline" and "crystalline" polymers interchangeably refer to polymers having a melt temperature (Tm). While not meaning to be limited by any theory, polyolefins are believed to undergo cavitation in combination with filler particles, because polyolefins are relatively non-polar and as such adhere poorly to filler particles. Linear polymers (that is, polymers in which chain branching occurs in less than 1 of 1,000 monomer units such as linear low density polyethylene) are even more desirable.

Non limiting examples of suitable orientable polymers include polymers and copolymers based on polystyrene, polycarbonate, polypropylene, polyethylene (for example, high density, very high density and ultra-high density polyethylene), polyvinyl chloride, polymethylpentane, polyamides, polyesters (for example, polyethylene terephthalate) and polyester-based polymers, polycarbonates, polyethylene oxide, polyoxymethylene, and combinations thereof. A first polymer is "based on" a second polymer if the first polymer comprises the second polymer. For example, a block copolymer is based on the polymers comprising the blocks. Preferred orientable polymers include polymers based on polyethylene and polypropylene, examples of which include linear polyethylene having Mw from 50,000 to 3,000,000 g/mol; especially from 100,000 to 1,500,000 g/mol, even from 750,000 to 1,500,000 g/mol.

Polypropylene (PP)-based polymers (that is, polymers based on PP) are one example of a particularly preferred orientable polymer for use in the present invention. PP-based polymers generally have a lower density than other orientable polyolefin polymers and, therefore, facilitate lighter articles than other orientable polyolefin polymers. PP-based polymers also offer greater thermal stability than other orientable polyolefin polymers. Therefore, PP-based polymers, made by any of the means known in the art may also form oriented articles having higher thermal stability than oriented articles of other polyolefin polymers. Suitable PP-based polymers include PP homopolymer; PP random copolymer (with ethylene or other alpha-olefin present from 0.1 to 15 percent by weight of monomers); PP impact copolymers. It is preferred to use a PP-based polymer that has a melt flow rate of greater than 0.3 g/10 min preferably greater than 1 g/10 min, more preferably greater than 1.5 g/10 min, and even more preferably greater than 2 g/10 min while at the same time having a melt flow rate of less than 8 g/10 min, preferably less then 6 g/10 min, more preferably less than 4 g/10 min and even more preferably less than 3 g/10 min. It is also preferred to use a PP-based polymer that has 55% to 70%, preferably 55% to 65% crystallinity.

PP obtained from either industrial or commercial recycle streams, including filled or reinforced recycled PP, may be used. The recycled PP may range from 0 to 100% of the orientable polymer used in the orientable polymer composition.

PP can be ultra-violet (UV) stabilized, and desirably can also be impact modified. Particularly desirable PP can be stabilized with organic stabilizers. The PP can comprise titanium dioxide or be free of titanium dioxide pigment.

The oriented polymer composition can further comprise fillers, including organic fillers and inorganic fillers. Organic fillers can be cellulosic or synthetic polymers. Fillers are preferably, inert inorganic fillers. Inorganic materials do not suffer from some of the challenges of organic fillers. Organic fillers include cellulosic materials such as wood fiber, wood powder and wood flour and are susceptible, even within a polymer composition, to color bleaching when exposed to the sun, and to decomposition, mold and mildew when exposed to humidity. Inorganic fillers are either reactive or inert. Inert fillers can be more preferred than reactive fillers in order to achieve a stable polymer composition density. However, inorganic fillers are generally denser than organic fillers. For example, inert inorganic fillers for use in the present invention typically have a density of at least two grams per cubic centimeter. Therefore, polymer compositions comprising inorganic fillers typically can contain more void volume than a polymer composition comprising the same volume of organic fillers in order to reach the same polymer composition density.

Non-limiting examples of inert inorganic fillers include talc, clay (for example, kaolin), magnesium hydroxides, aluminum hydroxides, dolomite, titanium dioxide, glass beads, silica, mica, metal fillers, feldspar, Wollastonite, glass fibers, metal fibers, boron fibers, carbon black, nano-fillers, calcium carbonate, and fly ash. Particularly desirable inert inorganic fillers include talc, calcium carbonate, magnesium hydroxide and clay. The inorganic filler can comprise one or a combination of more than one, inorganic filler. More particularly, the inert inorganic filler can be any one inert inorganic filler, or any combination of more than one inert inorganic filler. Embodiments of the invention can have 25 wt % or more, 35 wt %, 45 wt %, 50 wt %, 55 wt % or more, or even 60 wt % filler. As filler levels increase beyond 60 wt %, the tendency of the drawn OPC work piece to break during the drawing process increases substantially. Embodiments in which the filler level is between about 40 wt % and 60 wt % are preferred because cavitation can increase and density decrease (void volume increases) as filler level increases.

Solid state die drawing is different from extrusion, in which the material is pushed through a die in a hot, flowable state above the glass transition temperature Tg of the material, and pultrusion, where the material is both pushed and pulled. Solid state die drawing for making the OPC work piece to be subsequently machined to yield the OPC shaped article involves pulling the material having a softening temperature Ts at a temperature below its melt temperature Tm through a drawing die using drive rollers or drive tracks or belts (caterpillars) so that the material is under a state of tension and the die drawing occurs at a drawing temperature Td below the polymer composition softening temperature Ts. The drawing temperature Td is ten or more degrees below the polymer softening temperature, including, 15, 20, or even 30 degrees below Ts. Generally, the drawing temperature Td range is 40° C. or less below the polymer composition's Ts in order to achieve a linear draw ratio using economically reasonable draw rates. It is preferred to maintain the temperature of the polymer composition at a temperature within a range between the polymer composition's Ts and 50° C. below Ts inclusive of endpoints, while the polymer composition is drawn. Preferably, the polymer composition is cooled after exiting the drawing die prior to machining.

Drawing causes the long polymer chains of the material to elongate (or straighten) and generally align in the direction of drawing to yield a generally aligned fibrous long chain polymer structure. The individual polymer chains or groups of polymer chains can be somewhat entangled and also mechanically bonded to one another, giving the material great strength and toughness that can be greater than that of typical un-oriented plastic material or even some types of woods used to fabricate wood shaped articles.

Fillers and additives can be incorporated with the orientable polymer to make an orientable polymer composition. Such fillers function as impediments to polymer chain alignment during solid state drawing and have the effect of introducing cavitation into the material as the polymer chains are forced to slide past and detach from the particles during their elongation. Such cavitation reduces the density of the composite polymer material and may affect the machining of the OPC machine blank at a machining station. The filler particles can vary in size, shape and selection (blends) to control the level and character of the cavitation and may influence the behavior and outcome of the machining of the OPC machine blank (force required, rate of machining texture, appearance, etc.) Other additives may include pigments, fire retardants, and other additives known in the art. Some of these fillers, such as fire retardants, may comprise hard particles and may have a beneficial dual purpose as both a fire retardant and as a portion of, or all, the filler constituent of the polymer composition if cavitation of the material is desired.

Generally, the extent of cavitation (that is, amount of void volume introduced due to cavity formation during orientation) is directly proportional to filler concentration. Increasing the concentration of inorganic filler increases the density of a polymer composition, but also tends to increase the amount of void volume resulting from cavitation in the oriented polymer composition. Particularly desirable embodiments of the present filled oriented polymer composition article have 25 volume-percent (vol %) or more, preferably 35 vol % or more, more preferably 45 vol % or more void volume and even 55 vol % or more based on total polymer composition volume.

While not wishing to be bound by theory, it is believed that the number and size of crack propagation sites affect the surface characteristics observed on machining of the OPC work piece and can be dependent on the manner of compounding or blending of the filler into the thermoplastic. Although material that has pockets or lines of concentrated filler deposits not fully compounded (blended) with the polymer can be a satisfactory feedstock for shaped OPC articles, it is believed that well blended feedstock, as can be obtained when pre-compounding of filler and orientable polymer, can be a preferred feedstock.

Additional void volume may be created by the use of foaming agents, either exothermic or endothermic. Herein, "foaming agent" includes chemical blowing agents and decomposition products therefrom. Foaming agents include, but are not limited to moisture introduced as part of a filler, for example wood flour or clay, or by chemicals that decompose under the heating conditions of the billet extrusion process, Chemical blowing agents include the so-called "azo" expanding agents, certain hydrazide, semi-carbazide, and nitroso compounds, sodium hydrogen carbonate, sodium carbonate, ammonium hydrogen carbonate and ammonium carbonate, as well as mixtures of one or more of these with citric acid or a similar acid or acid derivative. Another suitable type of expanding agent is encapsulated within a polymeric shell. Blowing agent may be used up to at least 1.5 wt % blowing agent to achieve density reductions compared to an un-foamed billet of up to 20% or even more. Measure weight percent blowing agent relative to total oriented polymer composition weight.

According to an embodiment of the invention, the introduction of additional void volume via blowing agents can be used to help control the surface appearance of the machined shaped OPC article. Addition of blowing agent is believed to lead to a surface with reduced gouging and tear out compared to an equivalent filled OPC made without blowing agent. Applicants have found a relationship between the linear draw ratio of the OPC extrudate, the flexural modulus of the OPC work piece and the Shrink Ratio of the OPC work piece on the properties of the shaped OPC article. For example, if orientation is too low, that is the linear draw ratio is less than two, the flexural modulus is less than 0.60 GPa or the Shrink Ratio is greater than 0.8, depending on other characteristics, the OPC work piece can be prone to brittle failure in a direction transverse to the drawing direction, resulting in difficulties in machining and producing a shaped OPC article having acceptable surface characteristics.

Even when the OPC work piece has properties that make the OPC work piece machinable and produce a shaped OPC article having suitable aesthetic characteristics, the shaped OPC article may not be suitable for use in a particular application. For example, when the linear draw ratio is greater than seven, the flexural modulus is greater than 4.0 GPa, or the Shrink Ratio is less than 0.35, even if the article is machinable, the shaped OPC article can have a screw pull out force which is undesirably low for some trim applications for which screws are inserted in the end of a section, so that the length of the screw is essentially co-linear with the drawing direction. The OPC work piece can be formed such that it is machinable to produce a shaped OPC article having the desired surface characteristics as well as characteristics suitable for a particular construction application. For example, the OPC work piece can be formed and machined to provide an OPC shaped article which has a pull out force greater than 100 pounds force (445 Newtons), more preferably greater than 200 pounds force (890 Newtons), even more preferably greater than 300 pounds force (1334 Newtons) and yet more preferably greater than 400 pounds force (1779 Newtons) and may be even higher. Screw pull out can be measured using a mechanical testing machine, i.e., Instron tensile tester as follows: (a) insert a 2½ inch #8 screw into the cross-section of a board to a depth of 1½ inches; (2) pull the screw at a rate of 0.5 inches (0.125 cm) per minute and record the maximum force measured during the withdrawal of the screw from the board.

In some applications, there may be a balance between the linear draw ratio, flexural modulus, Shrink ratio, and density ranges that produce an OPC work piece that can be machined to provide a shaped OPC article having the desired aesthetic characteristics and the ranges that produce a shaped OPC article having the desired aesthetic characteristics in combination with physical characteristics which make the shaped OPC article suitable for use in a specific application. In an exemplary application, it can be desirable to fasten, either permanently or for temporary use, the shaped OPC article to another article using a fastener, such as a screw, inserted into the end of the shaped OPC article, collinear with the orientation direction of the shaped OPC article. If the force required to remove the fastener ("pull-out force") is too low, the attached articles may come apart, for example, under stresses encountered during shipping and handling. Applicants have found that in this type of scenario, it may be preferable to provide an OPC article having low enough orientation so that the polymer chains are incompletely aligned with the fastener shaft, allowing the fastener to get a better purchase on the material comprising the article. Thus it may be preferable in some applications, such as the above described application in which the OPC article is attached to another article using a fastener, that the shrink ratio be greater than 0.35, preferably greater than 0.40, or more, or the flexural modulus is less than 4.0, preferably less than 3.5 GPa, or less. At the same time, it can also be preferable that the modulus be greater than 0.6 and preferably greater than 1 GPa such that the OPC article may still have enough orientation to avoid brittle failure of the article. In some instances it may be preferred that density be between 0.65 and 1.0 g/cc in order to have more material available to hold the screw.

For other applications, for which screw pull-out is less important, or fastening is accomplished in a direction perpendicular to the direction of orientation, it can be preferred to have the flexural modulus as high as possible while still maintaining acceptable machinability. Flexural modulus as high as 4 or even 5.5 GPa can lead to shaped OPC articles with acceptable surface characteristics after machining and the shrink ratio can be as low as 0.35 or even 0.30 or even 0.25, depending on the other characteristics of the OPC work piece, and still result in an OPC work piece suitable for machining. The density of the OPC work piece may also be as low as 0.65 g/cc, 0.6 g/cc, or 0.55 g/cc or even 0.5 g/cc in some instances, depending on the other characteristics of the OPC work piece, and still result in an OPC work piece suitable for machining.

While not meant to be limited by any theory, Applicants have found that excessive orientation of the polymer chains during the solid state die drawing process can lead to an OPC work piece which when machined can have a fibrous surface or one with gouges and "tear-outs" that does not give the desired smooth machined appearance. Linear draw ratio and flexural modulus are measures related to the orientation of the polymer chains in the OPC work piece. Thus, it is preferred that the linear draw ratio is less than 7.0, preferably less than 6.5, more preferably less than 6.0, even more preferably less than 5.5, and still more preferably less than 5 and it is preferred that the linear draw ratio is greater than 2, preferably greater than 2.5 and more preferably greater than 3. The flexural modulus can be affected by the linear draw ratio, and can be one measure of an average degree of orientation of the oriented polymer composite. It is preferable that the flexural modulus be greater than 0.50 GPa, more preferably greater than 0.6 GPa, still more preferably greater than 1 GPa, and even more preferably greater than 1.3 GPa while simultaneously being less than 5.5 GPa preferably less than 4 GPa, more preferably less than 3.5 GPa, still more preferably less than 3 GPa and even more preferably less than 2 GPa. Flexural modulus can be measured according to ASTM D-6109-05.

Another measure of an oriented product which can vary with orientation of the polymer chains includes the degree to which the article shrinks back to its original length when heated to a temperature above its Tm. Because it is preferable for machining of OPC work pieces that orientation is low, it is preferable that the degree of shrinkage upon heating should also be low, when expressed as a Shrink Ratio (SR) as defined below. Shrink Ratio is high when there is little or no loss of length on heating and low when the loss on heating is high. Shrink Ratio is preferably, less than 0.8, more preferably less than 0.7, even more preferably less than 0.6 and is preferably greater than 0.25, more preferably greater than 0.30, even more preferably greater than 0.35, and still more preferably greater than 0.40. Shrink Ratio is measured by cutting the shaped OPC article to an initial length $L_{init}$, typically between 4 in (10 cm) and 10 in (25 cm), placing the piece in a preheated oven at 180 degrees Celsius for one hour, removing the piece from the oven, allowing it to cool and recording the final length $L_{fin}$. The Shrink Ratio (SR) is:

$$SR = L_{fin}/L_{init}$$

EXAMPLES

The following examples illustrate embodiments of the present invention and not necessarily the full scope of the present invention. After machining, the shaped OPC article can be characterized by flexural modulus, density, Shrink Ratio, screw pull out force, and surface characteristics.

Process for Preparing OPC Work Pieces:

Orientable polymer compositions for Examples 1-7 and Comparative Example 1 were prepared by feeding components together in a specific weight ratio either as individual components or as a combination of pre-compounded compositions to an extruder according to the formulations listed in Table 1. The orientable polymer compositions for Examples 1-7 and Comparative Example 1 have a softening temperature of approximately 163° C. The extruder heats and mixes the orientable polymer composition and then extrudes the composition through a die to produce an OPC composition billet (extrudate), which continues through a calibrator and cooling station to stabilize the billet dimensions. The billet is then thermally conditioned to a drawing temperature approximately 20° C. below the softening temperature of the orientable polymer composition.

The OPC composition billet is then continuously fed through a converging solid state drawing die using haul-offs, for example caterpillar pullers, to produce an OPC work piece. The OPC billet is drawn through the converging die at a draw rate of approximately 6-10 feet per minute. The solid state drawing die has a shaping channel that converges, and preferably continuously converges, to produce the OPC work piece.

The resulting OPC work piece has cross sectional dimensions of approximately 10 cm by 2.25 cm. These initially variable dimensioned work pieces are first planed in a machining station to consistent rectangular dimensions of approximately 9.5 cm×2 cm. The resulting OPC machine blank is then fed to a machining station (Profimet 23E machine with stations for five machining heads) and machined at a tool speed of 6000 rpm with a work piece feed rate of 23 ft/min (7 m/min) at ambient temperature. The work pieces are at ambient temperature. Characterization of the shaped OPC articles and the results of the machining step are shown in Table 2.

TABLE 1

OPC Formulations:

| Example No. | PP Inspire 404 | Recycle PP | Talc TC100 | Calcium carbonate | Foaming Agent | PE |
|---|---|---|---|---|---|---|
| Examples 1-7 | | | | | | |
| 1 | 47.6 | | | 50 | 0.30 | 0.30 |
| 2 | 47.6 | | | 50 | 0.30 | 0.30 |
| 3 | 47.5 | | | 50 | 0.26 | 0.26 |
| 4 | 47.4 | | 50.1 | | 0.25 | 0.25 |
| 5 | 47.4 | | 50.1 | | 0.25 | 0.25 |
| 6 | 42.7 | 4.8 | 50 | | 0.25 | 0.25 |
| 7 | 42.7 | 4.8 | 50 | | 0.25 | 0.25 |
| Comparative Example 1 | | | | | | |
| 1 | 48.0 | | | 46 | | |

Inspire D404 polypropylene (PP) is supplied by The Dow Chemical Co, Midland Mich.
Recycle PP—PP 1020-SC0655885 with melt flow of 6-10 g/10 min and was supplied by Muehlstein US, Norwalk Conn.
Talc TC 100 is supplied by Imerys, Société Anonyme, Paris France.
Calcium carbonate grade #10 white, supplied by Imerys, Société Anonyme, Paris France.
Foaming agent is F-07 supplied by KibbeChem Inc, Elkhart Ind.
Polyethylene is grade Paxon EA55-003 from Exxon.
Units are weight percent of total formulation, including for lubricant (below).

Examples 1 and 2 had 1.8 wt % lubricant with the remaining Examples 3-7 and Comparative Example 1 having 2 wt % lubricant. The lubricant was Baerolub W94112Tx supplied by Baerlocher USA, Cincinnati Ohio. Comparative Example 1 includes 4 wt % PH73642637 color concentrate from Clariant.

TABLE 2

Drawing and Work Piece Characteristics:

| Example No. | Linear Draw Ratio | Density (g/cc) | MOE* (GPa) | Shrink Ratio |
|---|---|---|---|---|
| Examples 1-8 | | | | |
| 1 | 3.5 | 0.61 | 1.03 | 0.595 |
| 2 | 4.25 | 0.65 | 1.79 | 0.530 |
| 3 | 6.25 | 0.53 | 1.42 | 0.412 |
| 4 | 3.5 | 0.77 | 1.35 | 0.446 |
| 5 | 4 | 0.67 | 1.61 | 0.432 |
| 6 | 5 | 0.63 | 1.91 | 0.320 |
| 7 | 5.5 | 0.62 | 2.04 | 0.327 |
| Comparative Example 1 | | | | |
| 1 | 7.5 | 0.74 | 4.18 | 0.250 |

*Flexural Modulus measured by ASTM D-6109-05.

Machining Results for Examples 1-7 and Comparative Example 1

Table 3 summarizes the results of machining the OPC machine blanks of Examples 1-7 and Comparative Example 1 into a shape similar to that illustrated in FIG. 5. Two to four OPC machine blanks were machined under each set of conditions and rated for machinability and surface characteristics. The average rating is reported. A rating of five for Surface Appearance Rating (Rs) means the surface is smooth and free of strands visible on the surface to the unaided eye, as well as the cut ends. An Rs of 1 indicates gouges and large strands visible at 1 meter with the unaided eye. Surface Appearance Ratings Rs between 2 and 5 are given for intermediate surface quality. For example, an Rs of 5, 4, 3 or 2 means surface defects are not visible at a viewing distance of 0.25 meters, 0.5 meters, 0.75 meters and 1 meter respectively with the unaided eye. A Machinability Rating (Rm) of 5 indicates very good machining and Rm of 1 indicates difficulties in machining, for example, "machine bogged down" or difficulties resulting in gouges and the like in surface appearance. Intermediate Rm between 2 and 5 are given for intermediate machinability. The overall Acceptability Rating Ra is the sum of the Surface Appearance Rating component Rs and the Machinability Rating component Rm.

TABLE 3

Machining Results:

| Example No. | Rs Rating | Rm Rating | Ra Rating | Machining Performance |
|---|---|---|---|---|
| Examples 1-7 | | | | |
| 1 | 5 | 5 | 10 | Very good machining, smooth surface. |
| 2 | 4 | 3.5 | 7.5 | OK machining, larger strands cut from operator side of profile; face OK, deep cut OK. |
| 3 | 4 | 4 | 8 | Machining well; larger strands than Example 1, but finish on the board was OK. |
| 4 | 5 | 5 | 10 | Very good machining, deep channel good. |
| 5 | 3.5 | 3.5 | 7 | Good machining; deep channel is rougher cut but acceptable. Surface is ok. |
| 6 | 2 | 2 | 4 | Channel OK, but rough; out of tolerances on edge near deep cut; not a fully desirable piece. |
| 7 | 3 | 3 | 6 | More stringy material cut off (not left on surface); deep cut is rougher, less acceptable machining performance. |
| Comparative Example 1 | | | | |
| 1 | 1 | 1 | 3 | Machine bogged down when feeding through; the deep channel was gouged open and not acceptable; the full board did not make it through. |

As illustrated in Table 3, Examples 1 and 4 had very good machining performance, which, as illustrated in Table 2, correspond to articles having a desired degree of polymer orientation as characterized by a combination of linear draw ratio, density, flexural modulus and Shrink Ratio. The results for Example 2-3 and 5-7 illustrate how machining results can vary as the degree of polymer orientation, as characterized by a combination of linear draw ratio, density, flexural modulus and Shrink Ratio, varies while still providing an article that can be machined with acceptable results. Comparative Example 1 illustrates how the machining results of an article can become unacceptable as the degree of polymer orientation falls outside a predetermined range as characterized by a combination of linear draw ratio, density, flexural modulus and Shrink Ratio. As can be seen with Comparative Example 1, while the density and flexural modulus may fall within the range which can provide articles with acceptable machining performance, the linear draw ratio and Shrink Ratio are outside the ranges expected to provide acceptable machining performance and thus the article of Comparative Example 1 was not useful for machining as it bogged down the machine and had large surface defects.

The material composition can include fillers such as calcium carbonate, magnesium hydroxide or talc and may include a foaming agent and additional additives. Applicants' believe that the surface characteristics observed on machining of the OPC work piece may also be dependent on the amount of foaming agent and on the manner of compounding or blending of the filler into the thermoplastic. The amount and physical properties, e.g., particle size, of the additives can also affect the outcome of the surface appearance by introducing weak points, lines or planes that can alter the way in which the material surface machines. For example, when machining under similar conditions a talc filled OPC work piece or a magnesium hydroxide work piece can have different surface appearance.

Other processing factors such as machining temperature and machining speed may also affect surface characteristics. Applicants have discovered that one or more of the above factors (degree of compounding, type of additives, amount of additives, type and blend of polymer, machining temperature, etc.) may be employed to control the appearance of the machined surface. In addition, variables of operation of the machine, e.g. tool rpm, tool geometry, feed rate of the OPC board through the tooling, and the like can be varied to achieve the desired appearance for a particular application.

Examples 8a and 8b followed the same procedure described above using the polymer composition of Example 1 drawn using a higher linear draw ratio than was used for Example 1 above. The OPC machine blanks were machined using a Profimet molding machine with five machining heads at a tool speed of 7500 RPM, instead of the 6000 rpm tool speed used for Examples 1-7 above. Characterization of the shaped OPC articles and the results of the machining step are shown in Table 4. As can be seen in Table 4, increasing the linear draw ratio resulted in an increase in the density and flexural modulus of the OPC article and an increase in the Shrink Ratio. The machining performance for Examples 8a and 8b was worse than for Example 1. Examples 1 and 8a and 8b illustrate that for a given formulation, the linear draw ratio, and thus the density, flexural modulus and Shrink Ratio, can be varied to provide an article having the desired machining performance and finish aesthetics. While the machining performance from Examples 8a and 8b was worse than for Example 1, the results show that shaped OPC articles can still be made even at high tool speeds of 7500 RPM.

TABLE 4

| Examples 8a and 8b: | | | | | | | | |
|---|---|---|---|---|---|---|---|---|
| Example No. | Linear Draw Ratio | Density (g/cc) | MOE* (GPa) | Shrink Ratio | Rs | Rm | Ra | Machining Performance |
| 8a | 6-6.5 | 0.71 | 3.02 | 0.32 | 3 | 3 | 7.0 | Surface for all samples is rougher and more marked than materials made at lower linear draw ratio. |
| 8b | 6-6.5 | 0.75 | 2.58 | 0.30 | | | | |

*Flexural Modulus measured by ASTM D-6109-05.

The results for Examples 1-7 and 8a and 8b illustrate compositions that can provide OPC articles with a density between 0.5 g/cc and 1.0 g/cc, flexural modulus between 0.60 and 5.5 GPa and Shrink Ratio between 0.30 and 0.8 that can provide an OPC work piece that can be machined without substantial tear-out or loose fibrils remaining on the surface and without winding or wrap-around of plastic fibers around a rotating tool. The results for examples 1-7 and 8a and 8b illustrate a relationship between how oriented and fibrous an OPC work piece is and the capability of that work piece to be machined to produce an article having the desired characteristics identified by Applicants. Applicants have found that only a limited portion of the density range, flexural modulus range and Shrink Ratio range, which relates to the amount of orientation in the OPC work piece and to the linear draw ratio used when producing the OPC work piece, is suitable for machining with tools used in machining real wood articles, such as a router or planar. Examples 1-7 illustrate that a work piece formed using a linear draw ratio in the range of 3.5-6.25, and having a density in the range of 0.53-0.77 g/cc, a flexural modulus in the range of 1.03-2.04, and a Shrink Ratio in the range of 0.320-0.595 can be suitable to varying degrees for machining in a manner similar to real wood. Examples 8a and 8b illustrate that even as the linear draw ratio increases up to 6.5 and the flexural modulus increases above 3.0, a machinable work piece can still be produced.

The processes and compositions described herein can be used to provide shaped OPC articles made from oriented polymer compositions that can be machined to provide a variety of shapes and have the desired aesthetic appearance and machining capabilities to be useful as substitutes for wood articles, for example, as decorative or intricate shaped articles or in other building applications requiring machined wood articles. The present processes and compositions provide an OPC article which can be produced by a tensile drawing process and can be machined to produce shaped articles using standard continuous wood working tools such as planers (thicknessers), routers, and molders, for example, that can be continuously shaped in the length direction of the work piece and is substantially free of defects on the worked surface of the article. In addition, the present processes and compositions address several challenges encountered by other composite materials such as high weight, high coefficient of thermal expansion (CTE) and blow-out, for example.

As described herein, the amount of orientation in an OPC machine blank can be adjusted based on the polymer composition, filler level, die design, ratio of billet cross-sectional area to drawing die exit cross-sectional area, drawing temperature, and amount of foaming agent used to form the OPC work piece, to yield a desired density, flexural modulus and/or Shrink Ratio of the OPC machine blank so as to provide an article suitable for machining in a manner similar to that of a traditional wood machine blank. The density, flexural modulus and Shrink Ratio can be provided as desired based on the materials, such as the type and relative amounts of orientable polymers and fillers to affect the amount of orientation in the OPC machine blank and thus affect the machinability of the machine blank. The machinability of the blank for a given formulation can further be affected based on the linear draw ratio used to form the OPC work piece.

In addition, the processes and compositions described herein can provide an OPC machine blank which is suitable for machining to any depth within the blank and from any side of the blank, and which decrease the occurrence of surface fibrillation and tear-out during machining and may also decrease the occurrence of blow-out during fastening of the article during use. As described above, surface fibrillation can occur when a typical OPC article is cut with a saw or is machined by any of a number of wood working techniques. "Tear-out" is when, during the machining process, a fibril or cluster of fibrils is produced at the cut or machined surface which, when pulled, can peel or "chip" away from neighboring aligned polymer chains leaving a gap in the surface. Blow-out can occur when screws are inserted and pieces of material break away, such as may occur if the material is too brittle.

The prior art has used a process which produces an article with a modified surface layer to attempt to address issues of surface fibrillation. However, these surface-based methods limit the extent to which the article can be machined in terms of the depth and/or number of sides of the article which can be machined. For example, these layer-based processes typically only affect the surface of the article to a depth on the order of micrometers, such as 80-400 microns, as disclosed in U.S. Pub. No. 2009/0155534, to O'Brien et al. This limitation in the depth of treatment is simply not practical for an article that is to be machined using wood working techniques in which cuts can vary from millimeters in depth to several inches and up to the entire depth of the article. These methods can also result in additional processing steps which can increase manufacturing time and cost. In contrast, the present processes and compositions provide an article which can be machined to any depth within the article and from any side of the article. The shaped OPC articles of the present invention can also be provided with a screw pull force suitable for use in trim applications in a manner similar to that of real wood to decrease the occurrence of blow-out during fastening.

In addition, the present articles are more suitable for use with higher speed shaping tools typically used in wood machining processes than articles which attempt to address fibrillation using a surface coating or layer. The ability to machine OPC machine blanks of the present invention at higher speeds more similar to the processing speeds used with real wood can increase through-put, decreasing production times. The processes and compositions described herein further minimize tool chatter and winding of plastic fibers around a rotating tool during high speed processing, further facilitating substitution of the present articles for real wood. Chatter is related to vibration of the machine or work piece and can decrease the accuracy of the machining operation, and may also shorten the life of the machine. The generated noise can lead to an unacceptably noisy work environment, requiring additional worker personal protective equipment.

The present articles also provide an article that can be cellulose-free article such that it will not rot and can be formulated to be more resistant to the effects of UV exposure than wood, while having greater strength and resistance to flexural or impact failure than conventional plastic materials. Such an article can have the further advantage over other plastic wood-replacement materials of not requiring pilot nail holes to avoid splitting when nailed or screwed and can be highly resistant to splitting or breaking when flexed or impacted (sharp blow of a hammer, foot traffic, etc.) due to the integrity of the drawn long strand polymer structure of the material. Because the article preferably does not contain cellulose (including no cellulose fillers) and can be resistant to absorbing moisture, the material is also less susceptible to warp or mildew as a result of prolonged exposure to moisture, and it can be further self-protected against insect damage (e.g., termites). In addition, such an article can be produced using fillers and pigments to produce an article with consistent color through the entirety of the article, and can also be painted. Thus, the manufacturer or consumer, as desired, can alter the coloring of the product. Moreover, the polymer material can be pre-colored during manufacture to reveal a single or multicolored (e.g., variegated) machined surface that may, for example, have the appearance of weathered wood at the time of purchase.

Another characteristic of the present article is that after machining it may be subsequently treated to improve or alter the end appearance. For example, the machined surface of the OPC article which may contain some degree of relatively fuzzy, lifted fibers or other imperfections can be further processed following machining by, for example, sanding and/or brushing and/or flame treating the surface to control the resultant texture and achieve the desired appearance while maintaining the look of the outer surface. A further advantage of this treatment can be its use to reduce on the machined surface indications of gouges (tear-out) or excess fibers on product whose surface is of less than the desired quality.

Additional embodiments which may be encompassed herein include:

A building product article useful for trim applications comprises a shaped article having length, width and thickness in which the thickness is less than that of either the associated length or width dimensions, wherein at least one surface has been machined (routered, planed (thicknessed), etc) so that a portion of the OPC shaped article is reduced in thickness along at least a portion of the length of the article and wherein the density of the shaped article is between 0.5 g/cc and 1.0 g/cc and the surface is free of defects (for example, gouges or "tear-outs" or fibrils) visible to the unaided eye.

Additional embodiments, of the shaped article include one or more of the following: (a) the shaped OPC article comprises filler; (b) the shaped OPC article comprises polyethylene or polypropylene; (c) the Shrink Ratio of the shaped OPC article is between 0.30 and 0.8 (inclusive of end points); (d) the screw pull out force of the shaped OPC article is greater than 200 pounds force (890 Newtons); (e) the density of the shaped OPC article is greater than 0.5 g/cc and less than 0.9 g/cc; (f) the flexural modulus of the shaped OPC article is greater than 0.60 GPa and less than 4.0 GPa; (g) the flexural modulus of the shaped OPC article is greater than 0.60 GPa and less than 3.5 GPa; (h) the flexural modulus of the shaped OPC article is greater than 1.0 GPa and less than 4.0 GPa; (i) the flexural modulus of the shaped OPC article is greater than 1.0 GPa and less than 3.5 GPa; and (j) the shaped OPC article comprises additives including but not limited to foaming agents, stabilizers, and fire retardants. The shaped article may be a decorative trim piece, non-limiting examples of which include coving or molding, or a functional part, for example a support board for an extruded aluminum sill or threshold. In a particularly preferred embodiment, a filled shaped OPC article comprises polyethylene or polypropylene and inorganic filler wherein the amount of filler, (based on polymer composition weight) is greater than 25 wt % and less than 60 wt %.

In another embodiment, the invention is a process to produce a shaped OPC article which comprises the steps of (a) providing a temperature conditioned extruded polymer composition to a solid state drawing die; (b) drawing that composition to produce an oriented polymer composition work piece; (c) providing the OPC work piece to a machining device comprising one or more machine tools; and (d) machining the OPC work piece to produce a surface that has been reduced in thickness by removal of material using machining tools to produce an oriented polymer composition shaped article; and further comprising the optional step (e) trimming the OPC work piece to an initial cross section which may occur before step (c).

In other preferred embodiments, the process can have one or more than one of the following additional characteristics: (a) the polymer composition is drawn so that the linear draw ratio is between 2.5 and 7; (b) the rotational speed of the high speed machining device is between 2,000 rpm and 12,000 RPM; (c) the high speed machining device comprises multiple machining heads; (d) trimming of the OPC work piece to a desired cross section and machining the OPC work piece to an OPC shaped article are accomplished in one pass through the high speed machining head(s); (e) the OPC work piece comprises filler; and (f) the feed rate of the work piece to the machining device is greater than 4 meters per minute.

In preferred embodiments, the polymer composition is drawn so that the linear draw ratio is between 3 and 4.5 or between 4.5 and 7. In still other preferred embodiments, the density of the work piece is between 0.5 and 0.65 g/cc or between 0.65 and 1.0 g/cc depending on whether the desired method of fastening of the shaped OPC article is perpendicular with the drawing direction or collinear to the drawing direction, respectively.

The shaped OPC articles of the invention can be used as interior or exterior decorative shaped articles in buildings or components of assemblies used in buildings, non-limiting examples of which include coving, molding, brick molding, sills, support pieces for thresholds, door or window lineals, corner trim pieces, or other components of window, door or other fenestration openings.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly disclosed.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention defined in the appended claims.

What is claimed is:

1. A solid state die drawn article formed from an oriented polymer composition (OPC) throughout its entire volume and having a length dimension, a width dimension, and a thickness dimension in which the width dimension and the thickness dimension are less than that of the length dimension, the article comprising:
    a density between about 0.5 g/cc and 1.0 g/cc;
    a shrink ratio between about 0.3 and 0.8;
    a flexural modulus between about 0.50 GPa and 5.5 GPa; and
    an orientation as defined in part by die drawing the OPC at a linear draw ratio of less than 7 and greater than 2;
    wherein the article defines an OPC work piece configured to have at least one surface machined by a power-operated-wood-working machine so that a portion of the OPC work piece is reduced in at least one of the width or thickness dimension along at least a portion of the length dimension to define an OPC shaped article having a machined surface defining a contour along the at least a portion of the length dimension and wherein the machined surface is free of defects visible to an unaided eye.

2. The article of claim 1 wherein the OPC further comprises at least one filler.

3. The article of claim 2 wherein the at least one filler is an inorganic filler, organic filler, or a combination of both.

4. The article of claim 2 wherein the filler comprises between about 25 wt % and 60 wt % of the article.

5. The article of claim 1 wherein the OPC comprises polyethylene, polypropylene, recycled polyethylene or recycled polypropylene, or a combination thereof.

6. The article of claim 1 wherein the at least one surface has been machined so that the article is reduced in at least one of the width dimension or the thickness dimension along at least a portion of the length dimension by at least 5% compared to a maximum width or thickness dimension of the article, respectively.

7. The article of claim 1 wherein the at least one surface has been machined so that a portion of the article is reduced in at least one of the width dimension or the thickness dimension along at least a portion of the length dimension of the article by at least 400 microns compared to a maximum width or thickness dimension of the article, respectively.

8. The article of claim 1 wherein when the portion of the OPC work piece is reduced in at least one of the width dimension or the thickness dimension along at least a portion of the length dimension of the OPC shaped article forms an external profile useful as an interior or exterior trim component in building applications.

9. A building structure including at least one component comprising the article of claim 1.

10. The building structure of claim 9 wherein the article is present as a component of an assembly for a window, door, or fenestration opening.

11. The article of claim 1 wherein the OPC comprises a foaming agent.

12. The article of claim 11 wherein the foaming agent is present in an amount of up to 1.5 wt %.

13. The article of claim 1 wherein the OPC comprises a polypropylene-based polymer having a melt flow rate greater than 1 g/10 min.

14. The article of claim 1 wherein the OPC comprises a crystalline polypropylene-based polymer having a crystallinity within a range of about 55 to 70%.

15. A solid state die drawn article formed from an oriented polymer composition (OPC) throughout its entire volume and having a length dimension, a width dimension, and a thickness dimension in which the width dimension and the thickness dimension are less than that of the length dimension, the article comprising:

a density between about 0.5 g/cc and 1.0 g/cc;
a shrink ratio between about 0.3 and 0.8;
a flexural modulus between about 0.50 GPa and 5.5 GPa; and
an orientation as defined in part by die drawing the OPC at a linear draw ratio of less than 7 and greater than 2;
wherein the article defines an OPC work piece configured to have at least one surface machined by a power-operated-wood-working machine so that a portion of the OPC work piece is reduced in at least one of the width or thickness dimension along at least a portion of the length dimension to define an OPC shaped article having a machined surface defining a contour along the at least a portion of the length dimension and wherein the machined surface is free of surface defects visible to an unaided eye of an observer at a viewing distance of 1 meter.

16. The article of claim 15 wherein the article has a pull out force of greater than 100 pounds force (445 Newtons).

17. A solid state die drawn article, the article comprising:
a body having a width dimension, a length dimension, and a thickness dimension and wherein the width dimension and the thickness dimension are less than that of the length dimension, the body comprising an oriented polymer composition (OPC) throughout its entire volume and having a density between about 0.5 g/cc and 1.0 g/cc, a shrink ratio between about 0.3 and 0.8, a flexural modulus between about 0.50 GPa and 5.5 GPa, and an orientation as defined in part by die drawing the OPC at a linear draw ratio of less than 7 and greater than 2 wherein the body defines an OPC work piece configured to have at least one surface machined by an electrically-powered wood-working machine to define at least one machined surface defining a contour along the at least a portion of the length dimension while having the machined surface free of defects visible to an unaided eye so that a portion of the OPC work piece is reduced in at least one of the width dimension or the thickness dimension along at least a portion of the length dimension to define an OPC shaped article, the contour includes a symmetric contour or asymmetric contour having any combination of angles, curves, or planes similar to that achievable with real wood in the electrically-powered wood-working machine.

18. The article of claim 17 wherein the electrically-powered wood-working machine is at least one of a router, molding machine, or planer.

* * * * *